United States Patent [19]

Anderson

[11] Patent Number: 5,787,167
[45] Date of Patent: Jul. 28, 1998

[54] VEHICLE TELEPHONE MOUNTING SYSTEM

[75] Inventor: Rick A. Anderson, Grand Haven, Mich.

[73] Assignee: Prince Corporation, Holland, Mich.

[21] Appl. No.: 713,140

[22] Filed: Sep. 12, 1996

[51] Int. Cl.⁶ .................................................. H04M 1/00
[52] U.S. Cl. ............................ 379/446; 379/454; 379/455
[58] Field of Search ............................ 379/446, 426, 379/454, 455, 449; 248/145, 417, 425, 286.1, 279.1, 284.1, 310; 455/89, 90

[56] References Cited

U.S. PATENT DOCUMENTS

| | | | |
|---|---|---|---|
| 2,770,682 | 11/1956 | Malone | 379/454 |
| 4,640,542 | 2/1987 | Watjer et al. | |
| 5,167,364 | 12/1992 | Wenning | 248/417 |
| 5,524,050 | 6/1996 | Boerema et al. | |
| 5,529,271 | 6/1996 | Dunchock | |
| 5,556,017 | 9/1996 | Troy | 379/454 |

*Primary Examiner*—Jack Chiang
*Attorney, Agent, or Firm*—Price, Heneveld, Cooper, DeWitt & Litton

[57] ABSTRACT

A telephone mounting system includes a platform for receiving a cellular telephone handset. The platform is coupled to a bracket which pivots between a lowered position within a vehicle storage bin and an extended position from the storage bin and a mounting system coupling the platform to the bracket for rotating the platform as the bracket is moved from a stored to an extended position thereby rotating a telephone handset from a vertical stored position to a horizontal use position.

14 Claims, 4 Drawing Sheets

VEHICLE TELEPHONE MOUNTING SYSTEM

BACKGROUND OF THE INVENTION

The present invention relates to a telephone mount for mounting a cellular telephone in a vehicle.

The use of cellular telephones in vehicles has become commonplace. Frequently, such telephones are mounted on a pedestal stand between vehicle seats for convenient access. Unfortunately, such mounting arrangements do not allow the concealed mounting of telephones which makes them readily visible and subject to theft. In vehicles with consoles, systems have been proposed for mounting the telephone in a concealed manner within the consoles. U.S. Pat. Nos. 4,640,542 and 5,524,050 represent two such telephone mounting systems in which a cellular telephone can be mounted in a concealed manner when not in use and moved to a convenient position for use through the mounting mechanism.

With the increasing downsizing of many vehicles, relatively large consoles are frequently not available. As a result, the unique mounting structures proposed in the past and as represented by the above identified patents are not suitable for relatively small consoles with little storage space. Accordingly, there exists a need for a concealed retractable telephone mounting system for relatively small storage spaces such as newer consoles which are relatively narrow.

SUMMARY OF THE PRESENT INVENTION

The system of the present invention provides a telephone mounting system by which a relatively thin rectangular cellular telephone handset can be mounted in a vertically stored position, that is, on edge for storage in a relatively narrow armrest storage compartment and, when extended from the storage compartment, rotated to a substantially horizontal position for easy access for use. Systems embodying the present invention include a platform for supporting a cellular telephone handset, said platform coupled to an arm which pivots between a lowered position within the vehicle storage compartment and a position extended from said storage compartment and means coupling said platform to said arm for rotating said platform as said arm is moved from a stored to an extended position for rotating a telephone handset mounted on said platform from a vertical stored position to a horizontal use position.

In one embodiment of the present invention, the rotation of the platform is achieved by providing a telescopic tube within said arm which is coupled to said platform and which includes a cam slot cooperating with the cam associated with said platform for extending and rotating the telephone handset as it is extended from the storage compartment. In one embodiment of the invention also, a compression spring is employed for urging the telescopic tube to an extended and rotated position as the telephone is removed from the storage bin. With such a system, therefore, an easily operated, automatically rotated and extended telephone mounting system is provided which stores a relatively thin cellular telephone handset in vertical orientation within a somewhat narrow storage bin, such as an armrest or console, and rotates the handset to a generally horizontal use position automatically as it is extended from its stored position.

These and other features, objects and advantages of the present invention will become apparent upon reading the following description thereof together with reference to the accompanying drawings.

DETAILED DESCRIPTION OF THE PREFERRED EMBODIMENT

Figure 1:
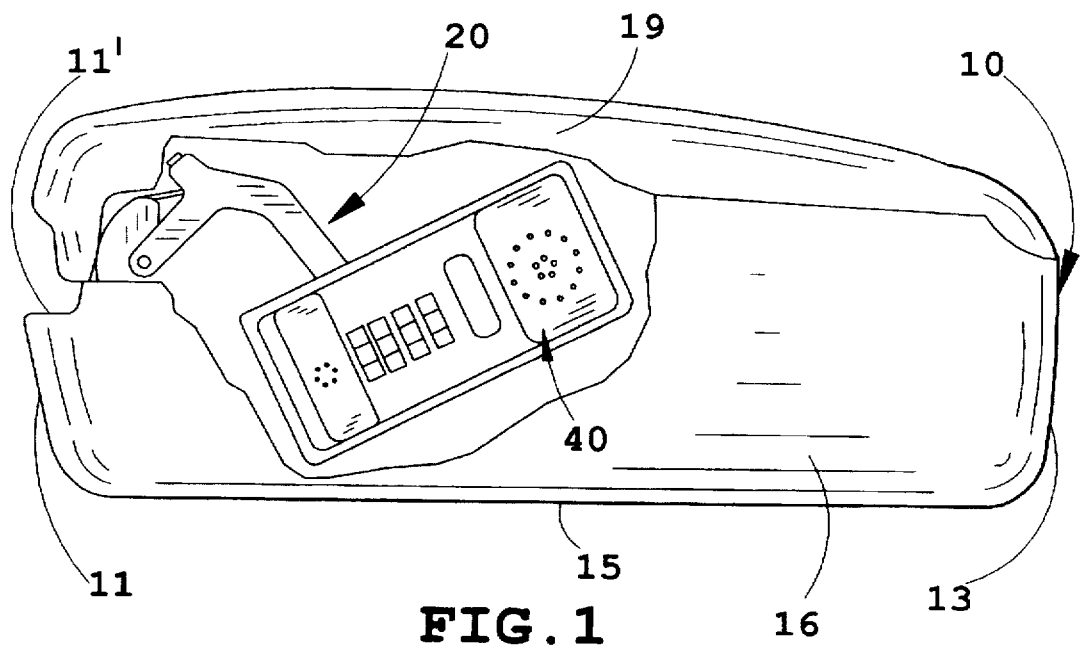
FIG. 1 is a left-side elevational view, partly broken away, of a vehicle armrest showing a telephone mounting system embodying the present invention.
Figure 2:
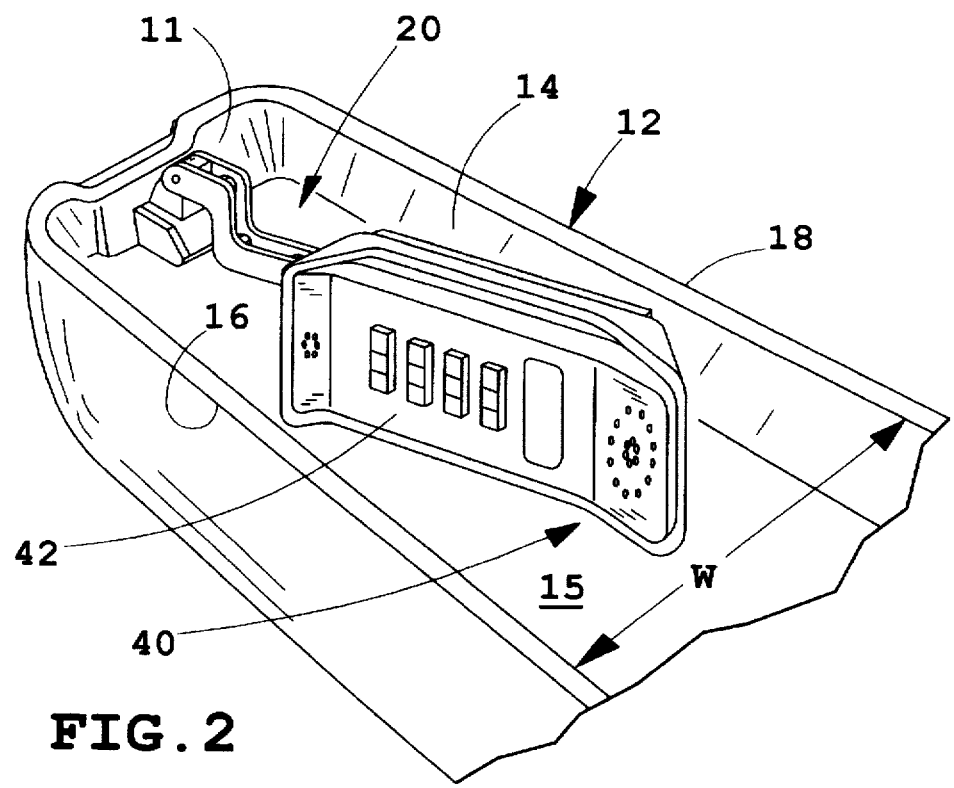
FIG. 2 is a fragmentary perspective view of the armrest and telephone mount shown in FIG. 1, shown with the armrest cover open to illustrate the storage of the telephone handset within the storage bin defined by the armrest.
Figure 3:
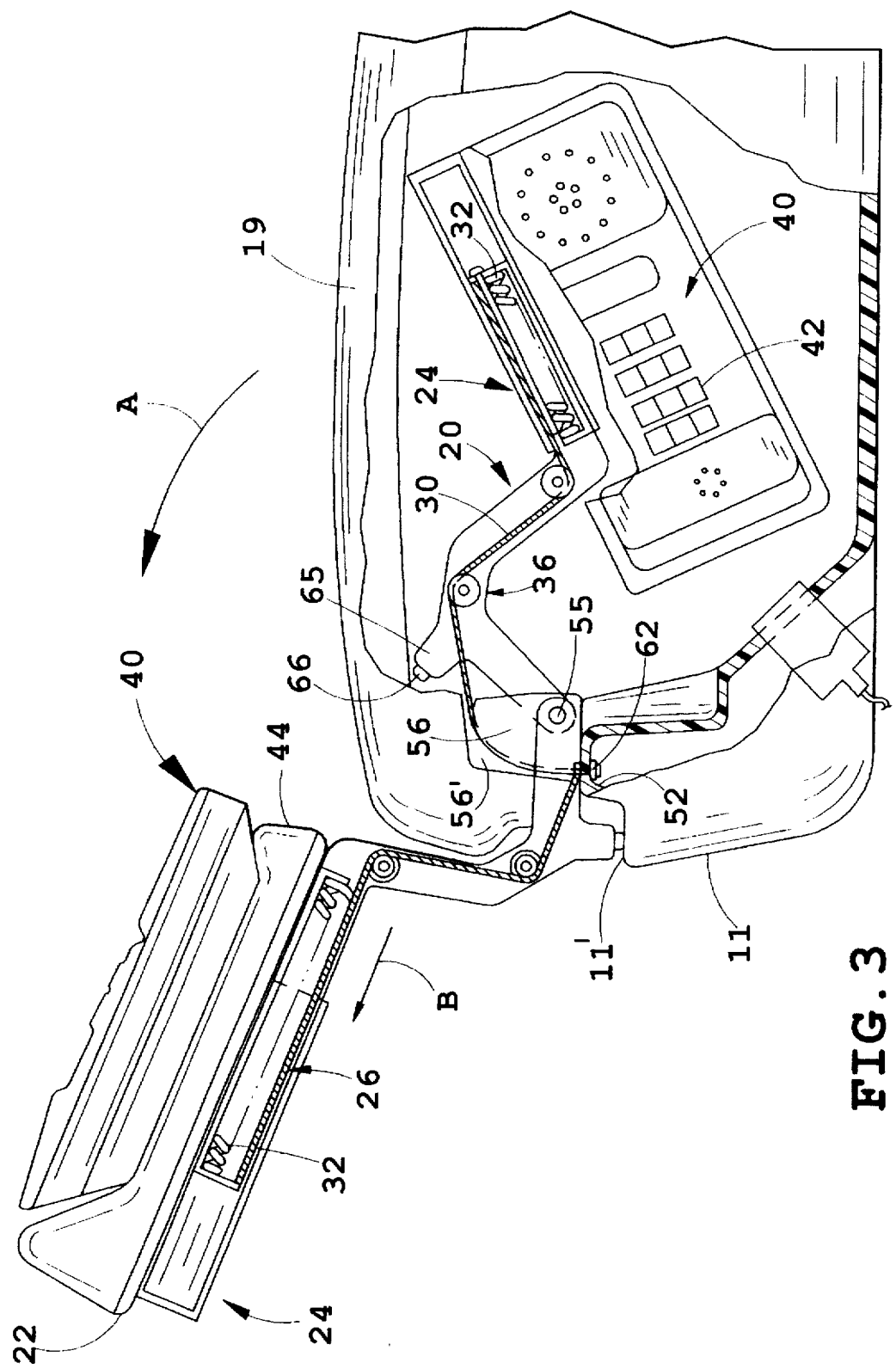
FIG. 3 is an enlarged fragmentary left-side elevational view, partly broken away, of the telephone mounting system of the present invention shown partly in cross section and illustrating the position of the telephone handset in both the stored and use positions.

Referring initially to FIGS. 1 and 2, there is shown an armrest 10 for a vehicle, such as an automobile. Armrest 10 typically will be mounted between the front seats and can be moved from a horizontal use position, as shown in FIG. 1, to a vertically stored position when not in use. The armrest includes a lower housing 12 defining a storage bin 14 having a left sidewall 16, a right sidewall 18, front and rear walls 11 and 13, respectively, and a floor 15. Armrest 10 also includes a cover 19 for selectively covering bin 14 and for such purpose cover 19 can be pivotally mounted to the rear wall 13 utilizing a conventional pivot mechanism as well as including a locking latch (not shown) associated with the front wall 11 for latching the cover in a closed position. The outside of front wall 11 includes a generally horizontally extending ledge 11' which, as seen in FIG. 3, provides a support platform for the mounting assembly 20 when the telephone handset is in a fully extended position.

Figure 4:
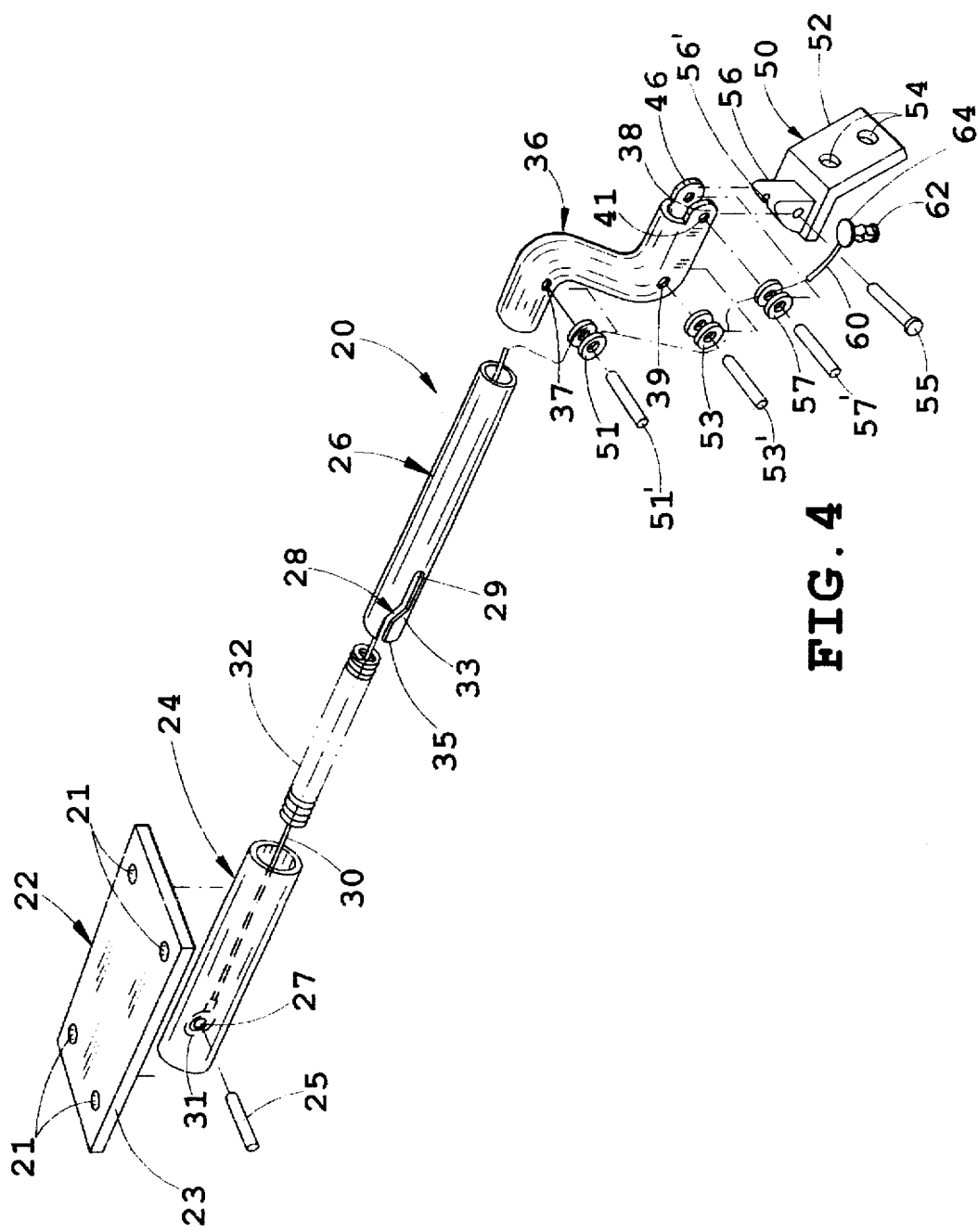
FIG. 4 is an exploded perspective view of the telephone mounting system of the present invention.
Figure 5:
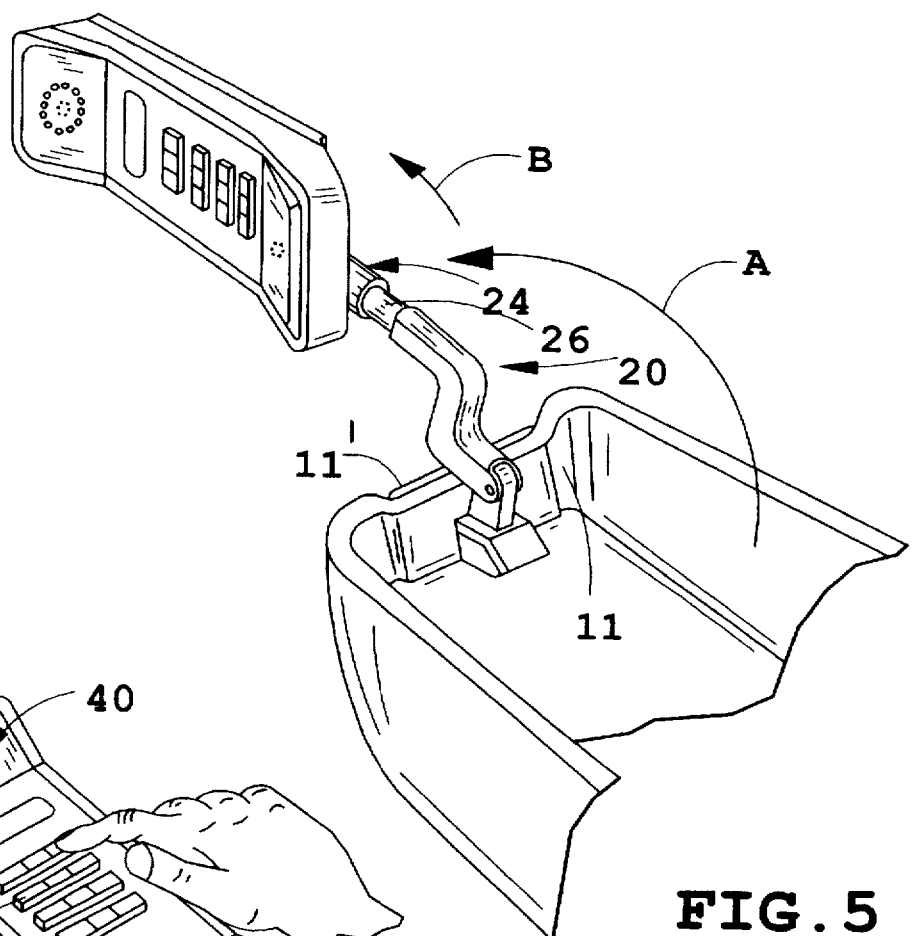
FIG. 5 is a fragmentary rear perspective view showing the extension of the telephone handset from the storage bin utilizing the mounting system of the present invention.
Figure 6:
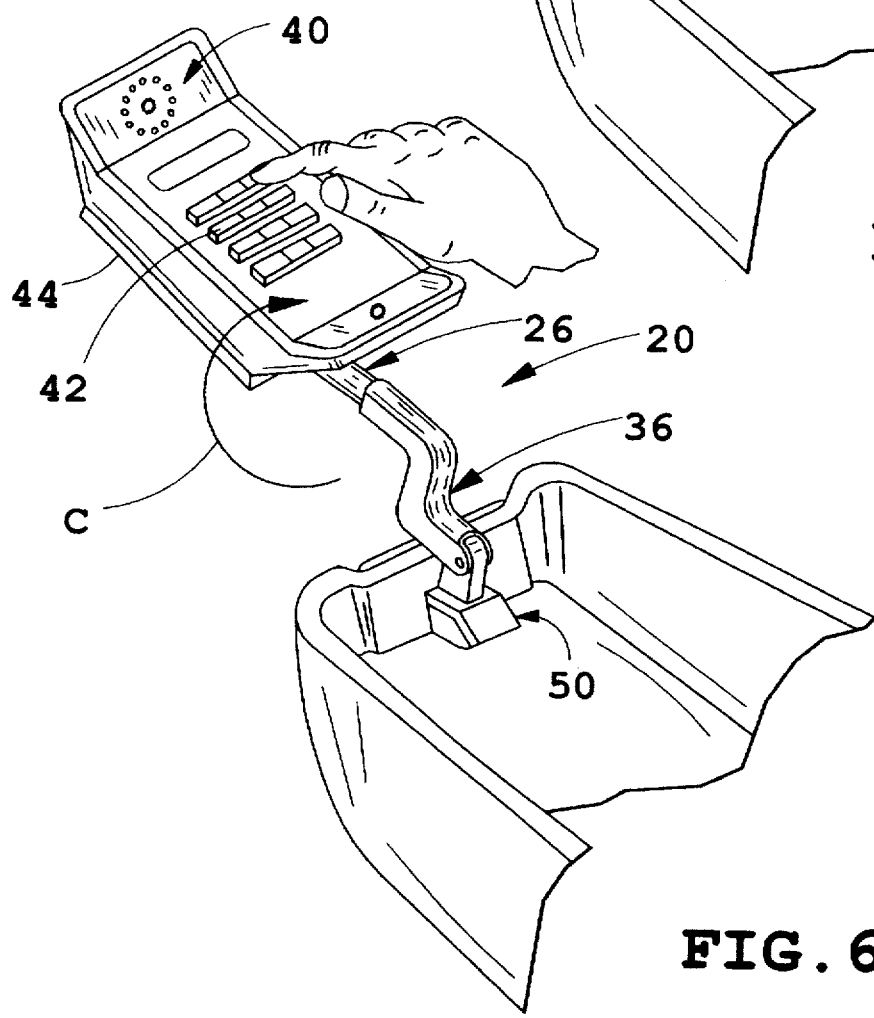
FIG. 6 is a fragmentary perspective view illustrating the telephone handset in a fully extended use position.

Mounted to the front wall 11 of armrest 10 is the telephone mounting system 20 of the present invention for mounting thereto a cellular telephone handset 40, which can be any number of commercially available cellular telephones which have a generally thin profile but are sufficiently wide to allow ready access to the telephone number dialing keypad 42. As seen in FIGS. 1 and 2, the telephone handset 40 is stored vertically on its edge, thereby presenting the thinnest profile to the width "W" (FIG. 2) of the storage bin 14 associated with armrest 10. As a result, a relatively narrow armrest can accommodate a relatively wide cellular telephone utilizing the telephone mounting system 20 of the present invention. As the telephone handset is extended from its fully stored position, as shown in FIGS. 1 and 2, to its use position, as illustrated in FIGS. 5 and 6, it moves forwardly, as indicated by arrow B in FIG. 5, and simultaneously rotates, as indicated by arrow C in FIG. 6, while it moves from the storage position by swinging upwardly in the arc indicated by arrow A in FIG. 5. The unique mounting system 20 of the present invention automatically controls such movement such that it is only necessary for the user to grip the telephone handset and raise it from the storage bin for extending it into a readily accessible use position, as illustrated in FIG. 6. The unique telephone mounting assembly which accomplishes this motion and storage orientation for the cellular telephone handset is now described in detail in connection with FIGS. 3 and 4.

Telephone handset 40 will typically include its own cradle 44 which allows the handset to be removably mounted thereto. The cradle 44 is mounted to a support platform 22 utilizing conventional fastening screws which extend through mounting apertures 21 in platform 22. Platform 22 is secured, such as by welding, to a cylindrical sleeve 24, as best seen in FIG. 4, near one edge of the platform 22 but extending in longitudinally parallel relationship near the left edge 23 of the platform.

Assembly 20 further includes a telescopic tube 26 which extends within sleeve 24 and which has a pair of cam slots 28 on opposite sides which engage a cam pin 25 extending through an aperture 27 in sleeve 24. Cam pin 25 anchors one end of a control cable 30 which end includes a mounting ring 31 through which cam pin 21 extends, thereby anchoring the end of flexible cable 30 within sleeve 24 under platform 22. A compression spring 32 surrounds cable 30 and extends within telescopic tube 26 and sleeve 24 to urge, as described in greater detail below, the sleeve 24 and platform 22 attached thereto outwardly from telescopic tube 26 as the telephone handset is moved from a stored to an extended position. The cam slot 28 curves around the wall of tube 26 approximately 90° with a trailing edge 29 extending substantially parallel to the longitudinal axis of the tube, an intermediate radially extending curved section 33 which curves through an arc of approximately 90° around the radius of the cylindrical tube 26 and a substantially longitudinally extending entry slot 35 which is generally parallel to the longitudinal axis of tube 26 but offset approximately 90° from the position of trailing edge 29. Thus, as pin 25 within sleeve 24 moves from the telephone retracted position at the end of trailing edge 29 of slot 28 to the use position in the area of entry slot 35, the telephone platform 22 will rotate approximately 90°.

The telescopic tube 26 is secured to one end of a generally S-shaped bracket 36 which has a U-shaped cross section and which has a pair of spaced mounting flanges 38 and 46 at one end for pivotally mounting the bracket to a second mounting bracket 50 having a flange 52 with apertures 54 therein for securing the bracket to the inside of the front wall 11 of storage bin 14. Bracket 50 includes an upstanding mounting post 56 over which the flanges 38 and 46 extend and are pivotally mounted thereto by means of a pivot pin 45. Cable 30 extends through telescopic sleeve 26 and around three pulleys 51, 53 and 57, which are mounted by associated axles 51', 53' and 57' within apertures 37, 39 and 41, respectively, extending through bracket 36. The end 60 of cable 30 remote from end 31 is anchored to the underside of mounting bracket 50 by means of an anchoring screw 62 and ring 64 (FIG. 4) such that as the telephone is moved from a position within the storage bin, as shown in FIG. 3, outwardly in the direction indicated by arrow A. The compression spring will urge the sleeve 24 outwardly in the direction indicated by arrow B in FIGS. 3 and 5 expanding the spring and moving pin 25 along cam slot 28 to rotate the telephone handset from the vertically stored position to a horizontal use position as illustrated in FIGS. 3, 5 and 6. The anchor pin 62 for the end 60 of cable 30 is offset from the pivot pin 55 for the mounting assembly, as best seen in FIG. 3, thereby causing the cable to draw the sleeve 24 rearwardly over telescopic tube 26 as the telephone is moved to a retracted position. For such purpose, the mounting post 56 of the bracket 50 includes a cable guide 56' into which the cable extends, as seen in FIG. 3. The pulleys 51, 53 and 57 also serve to center and position the cable within the bracket 36.

S-shaped bracket 36 includes thereon a support leg 65 (FIG. 3) having a cushioned pad 66 which rests upon the support platform 11' of the front wall 11 of storage bin 14, as best seen in FIG. 3, to position the telephone handset at an inclined angle with respect to the longitudinal axis of the armrest 10 but substantially horizontal in an inclined orthogonal plane for use, as seen in FIG. 6. The armrest cover 19 can be closed when the telephone is in the use position, as shown in FIG. 3.

Thus, with the telephone mounting system of the present invention, a unique system for storing a telephone handset in a relatively narrow armrest is provided and one by which the handset, as its mounting cradle is grasped and removed from the storage bin 14 associated with armrest 10 to automatically extend and rotate the handset in the direction indicated by arrows B and C (FIGS. 5 and 6) such that it is conveniently positioned forward of the front wall 11 of the armrest 10 for use. The telephone handset is automatically rotated and the spring 32 compressed as the operator rotates the handset back into the armrest by pressing the bottom of the mounting platform 22 rearwardly. The telephone power, control and antenna cable can be trained adjacent the mounting bracket 36 utilizing conventional cable clamps or the like with sufficient cable slack to allow the flexing of the necessary interconnections of the phone to the antenna and the phone power supply and control circuit. Although shown in an armrest 10, the telephone mounting system can be mounted in a fixed console or other storage bin in a vehicle.

It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows.

What is claimed is:

1. A telephone mounting system for mounting a telephone handset in a stored position within a storage bin for a vehicle and an extended use position, said telephone mount comprising:

a storage bin;

a mounting platform for receiving a telephone handset;

mounting means for pivotally mounting said platform to said storage bin such that as said platform and telephone handset secured thereto are moved from a stored to an extended position, said platform rotates such that said platform is oriented in a generally vertical plane within the storage bin and rotates when in a fully extended position for access to a telephone handset mounted thereto, wherein said means for mounting said platform to said storage bin includes a cam and a cam follower which responds to the movement of the rotational pivoting of said platform for rotating said platform and wherein said mounting means comprises a first sleeve including one of a cam pin and slot extending therethrough and a tube telescopically fitted to said mounting sleeve and including the other of a cam pin and slot and a pivot mounting bracket mounted on said tube for pivotally mounting said mounting means to said storage bin, and further including a flexible cable coupled to said cam pin and anchored at an opposite end to said storage bin at a position spaced from the pivot connection of said pivot mounting bracket to said storage bin such that said cable draws said sleeve and said tube together as said mounting platform is moved to a retracted stored position.

2. The mounting system as defined in claim 1 and further including a compression spring extending between said cam pin and said mounting bracket to urge said mounting platform outwardly and said cam pin along said cam slot as said mounting platform is moved from a retracted position to an extended position.

3. The mounting system as defined in claim 2 wherein said cam slot comprises a pair of parallel slots formed in said telescopic tube, said slots curving through an angle of approximately 90° from one end of said cam slot to an opposite end of said cam slot.

4. The mounting system as defined in claim 3 wherein said parallel slots include an open leading edge extending substantially parallel to the longitudinal axis of said telescopic tube, an intermediate section which curves along said wall of said telescopic tube through an arc of approximately 90° and an opposite end extending substantially parallel to the longitudinal axis of said telescopic tube.

5. The mounting system as defined in claim 4 wherein said mounting bracket includes a cable guide for centering said cable within said mounting bracket.

6. The mounting system as defined in claim 5 wherein said mounting bracket comprises a substantially U-shaped cross-sectional member including a plurality of rotatable pulleys mounted therein for guiding said cable from said telescopic tube to said end anchored to said bracket.

7. The mounting system as defined in claim 6 wherein said cable extends concentrically within said spring.

8. A system for mounting a telephone handset in a vertically stored position within a storage bin of a vehicle for movement to an extended, generally horizontally aligned use position comprising:

a platform for receiving a telephone handset;

a telescopic arm having one end coupled to said platform;

a mounting bracket for pivotally coupling an opposite end of said telescopic arm to a storage bin of a vehicle; and means coupled to said telescopic arm for rotating said platform as it is pivotally moved from a stored position within said storage bin in which said platform orients a telephone handset mounted thereon in a generally vertical plane to a plane rotated approximately 90° from said stored position as said platform is extended from said storage bin to a use position, wherein said telescopic arm extends as said platform is rotated from said compartment, and wherein said telescopic arm comprises a sleeve and a tube slideably mounted to one another, wherein said sleeve includes one of a cam pin and slot extending therethrough and said tube includes the other of a cam pin and slot for rotating said sleeve and tube as they slide with respect to one another, and further including a flexible cable coupled to said cam pin and anchored at an opposite end at a position spaced form the pivot connection of said mounting bracket to the storage bin such that said cable draws said sleeve and said tube together as said mounting platform is moved to a retracted stored position.

9. The system as defined in claim 8 and further including a compression spring extending between said cam pin and said mounting bracket to urge said mounting platform outwardly and said cam pin along said cam slot as said mounting platform is moved from a retracted position to an extended position.

10. The mounting system as defined in claim 9 wherein said cam slot comprises a pair of parallel slots formed in said tube, said slots curving through an angle of approximately 90° from one end of said cam slot to an opposite end of said cam slot.

11. The mounting system as defined in claim 10 wherein said parallel slots include an open leading edge extending substantially parallel to the longitudinal axis of said tube, an intermediate section which curves along said wall of said tube through an arc of approximately 90° and an opposite end extending substantially parallel to the longitudinal axis of said tube.

12. The mounting system as defined in claim 11 wherein said mounting bracket includes a cable guide for centering said cable within said mounting bracket.

13. The mounting system as defined in claim 12 wherein said mounting bracket comprises a substantially U-shaped cross-sectional member including a plurality of rotatable pulleys mounted therein for guiding said cable from said tube to said end anchored to said bracket.

14. The mounting system as defined in claim 13 wherein said cable extends concentrically within said spring.

\* \* \* \* \*